United States Patent [19]

Endo et al.

[11] Patent Number: 4,835,640
[45] Date of Patent: * May 30, 1989

[54] MAGNETIC HEAD HAVING A STABILIZED ZIRCONIA SLIDER

[75] Inventors: Juro Endo; Shiro Murakami; Yukiharu Takada; Yoshiharu Koike, all of Saitama, Japan

[73] Assignee: Hitachi Metals Ltd., Tokyo, Japan

[*] Notice: The portion of the term of this patent subsequent to Nov. 24, 2005 has been disclaimed.

[21] Appl. No.: 122,402

[22] Filed: Nov. 19, 1987

Related U.S. Application Data

[62] Division of Ser. No. 777,508, Sep. 19, 1985, Pat. No. 4,709,284.

[30] Foreign Application Priority Data

Sep. 20, 1984 [JP] Japan .................. 59-197208

[51] Int. Cl.$^4$ .................. G11B 5/66; G11B 5/60; G11B 17/32
[52] U.S. Cl. .................. 360/103
[58] Field of Search .............. 360/103, 102, 110, 125, 360/122; 428/622, 408, 900

[56] References Cited

U.S. PATENT DOCUMENTS

| | | | |
|---|---|---|---|
| 3,823,416 | 7/1974 | Warner | 360/122 |
| 4,251,841 | 2/1981 | Jacobs | 360/122 |
| 4,411,963 | 10/1983 | Aine | 428/622 |
| 4,430,440 | 2/1984 | Wada et al. | 501/105 |
| 4,503,125 | 3/1985 | Nelson et al. | 428/408 |
| 4,559,572 | 12/1985 | Kumasaka et al. | 360/110 |
| 4,582,812 | 4/1986 | Furukawa et al. | 501/87 |
| 4,598,052 | 7/1986 | Wada et al. | 501/87 |
| 4,709,284 | 11/1987 | Endo et al. | 360/103 |

FOREIGN PATENT DOCUMENTS

| | | |
|---|---|---|
| 59-72307 | 5/1982 | Japan . |
| 58-121179 | 7/1983 | Japan . |
| 59-7823 | 1/1984 | Japan . |

Primary Examiner—John H. Wolff
Attorney, Agent, or Firm—Finnegan, Henderson, Farabow, Garrett & Dunner

[57] ABSTRACT

A magnetic recording device comprises a magnetic disk having a magnetic recording layer formed on a substrate, a slider, a magnetic core attached to the slider, and a magnetic head adapted to be brought into contact with and separated from the surface of the magnetic disk. In this magnetic recording device, the magnetic recording layer of the magnetic disk is made of a Co-based alloy and the slider of the magnetic head has stabilized zirconia as the main phase thereof.

8 Claims, 2 Drawing Sheets

MAGNETIC HEAD HAVING A STABILIZED ZIRCONIA SLIDER

This is a division of application Ser. No. 777,508 filed Sept. 19, 1985, now U.S. Pat. No. 4,709,284.

FIELD OF THE INVENTION AND RELATED ART STATEMENT

This invention relates to a magnetic recording device, and more particularly to a magnetic recording device which is notably improved in sliding property and abrasion resistance due to selection of a material for a magnetic head and a material for a magnetic recording layer in a magnetic disk.

As the magnetic head to be used in reading out information from the magnetic disk and recording to the disk, the floating head of the kind disclosed in U.S. Pat. No. 3,823,416 and the Japanese Patent Publication No. SHO 57(1982)-569, for example, is widely in use. In the floating head, a magnetic core made of a magnetic material of high permeability is fixed at the trailing end part of a slider. The magnetic core is provided on the lower surface side of the slider with a magnetic conversion gap. The magnetic core is also furnished with an electromagnetic conversion winding to form a magnetic transducer.

The floating magnetic head constructed as described above is kept in light contact with the magnetic disk by the force of a spring, that is zimbal, while the magnetic disk remains at rest. While the magnetic disk is rotating, the air near the surface of the magnetic disk is similarly moved to exert a force for lifting the lower surface of the slider. During the rotation of the magnetic disk, therefore, the magnetic head floats up and stays away from the magnetic disk.

When the rotation of the magnetic disk starts and stops, the magnetic head slides on the magnetic disk. As regards the condition of the contact to be established when the rotation of the magnetic disk is stopped, the flow of the air on the surface of the magnetic disk is slowed down gradually as the rotation of the magnetic disk is reduced. At the moment that the magnetic head is wholly deprived of its buoyance, the magnetic head collides with the surface of the magnetic disk, rebounds thereon, and lands again on the surface of the disk. After repeating this series of motions several times, the magnetic head is brought to a stop as though it were dragged on the magnetic disk. The magnetic head is required to withstand these impacts exerted thereon during the start or stop of the rotation of the magnetic disk. This performance may be referred to as CSS (contact-start-stop) resistance property hereinafter.

For the CSS resistance property to be improved, it is essential that the sliding property of the slider of the magnetic head should be heightened. It is equally important that the surface of the slider should be flat and devoid of pore and amply resistant to abrasion.

The magnetic head is electrically charged by friction when it comes into sliding contact with the magnetic disk as described about. When the amount of this charge excessively increases, there ensues the possibility that the signal winding on the magnetic transducer will generate noise and the amount of buoyance of the magnetic head will be varied. It is, therefore, desirable that the slider of the magnetic head should be formed of a material which is least susceptible to electric charging due to friction.

Further, the slider of the magnetic head generally has an extremely complicated structure as indicated in U.S. Pat. No. 4,251,841, and the priority document therefor, Japanese Patent Application Laid-open No. SHO 55(1980)-163,665. For the magnetic head in such a complicated structure to be fabricated in high efficiency, it is essential that the material forming the slider should excel in machinability. To be specific, this material is required to offer no appreciable resistance to cutting during the process of machining and avoid clogging the cutting blade, for example. Further, during the machining process, crystal grains fall off the cut portion of the material. The portion which falls off as described above is desired to be as small as possible. By this reason, the crystal grains of the material forming the slider are desired to be as small as possible.

To summarize the matters described above, the material forming the slider of the magnetic head is generally expected to fulfil the following requirements:

(1) It should excel in sliding property.
(2) It should excel in abrasion resistance.
(3) It should yield to electric charging due to friction with difficulty.
(4) It should enjoy high machinability.
, (5) It should be formed of crystal grains of small diameter.

What has been proposed as fulfilling all these requirements is found, for example, in Japanese patent Application Laid-open No. SHO 55(1980)-163,665. The slider described in the patent application is made of a mixture of $Al_2O_3$ with TiC, with the weight ratio of $Al_3O_3$ to TiC falling in the range of 60:40 to 80:20. In the specification of the patent application, there is a description to the effect that the $Al_2O_3$-TiC ceramic excels in machinability, avoids producing crack or chipping when machined in a complicated shape, and enjoys high abrasion resistance.

The slider which is formed of the aforementioned $Al_2O_3$ and TiC, however, is deficient in the CSS resistance property, particularly the sliding property, which is one important property for the slider. $Al_2O_3$ possesses a high electric insulating property. To decrease the electric resistance and lower the electric charging property, it is necessary as pointed out in the specification of the patent application that the content of TiC, an electroconductive compound, in the material should be increased.

Incidentally TiC possesses high rigidity. So an increase in the TiC content naturally results in degradation of the sliding property of the material.

The properties such as sliding property and abrasion resistance exhibited by the magnetic head should be affected greatly by the nature of the magnetic disk, with which the magnetic head comes in sliding contact.

In recent years, the Co based magnetic recording layer has come to attract growing attention as a vertically magnetizing recording film whose easily magnetizing axes fall in a direction perpendicular to the magnetic recording layer. In the case of the vertically magnetizing recording system, the amount of buoyance of the magnetic head and the distance between the magnetic head and the magnetic disk must be smaller than in the plane magnetizing recording film system which effects magnetization in a direction falling within the plane of the film. Thus, the vertically magnetizing recording system is required to possess outstanding performance in sliding property, abrasion resistance, etc.

Thus, the improvement in the materials for the magnetic head, etc. and the mutual matchability of the slider of the magnetic head and the magnetic disk demand researchers' studies.

The conventional magnetic disk has a fundamental structure comprised of a substrate of aluminum-based alloy or ceramic material, an undercoating layer deposited thereon, and a magnetic film layer superposed thereon and optionally a protective film layer formed thereon. Various studies are now under way in search of means of enhancing the recording density.

No study, however, is being made on the mutual matchability of the magnetic head and the magnetic disk.

Japanese Patent Application Laid-open SHO 55(1980)163,665 has proposed an invention aimed at fulfilling the various properties the slider of the magnetic head is expected to possess. The slider disclosed above, however, is deficient in the CSS resistance property and the sliding property and is not capable of readily lowering the electric charging property.

The conventional magnetic head and magnetic disk have not been given due consideration as to their mutual matchability.

It may well be concluded that the conventional magnetic recording device has not fully satisfied such basic properties as sliding property and abrasion resistance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

An object of this invention is to provide a magnetic recording device using in the magnetic head thereof a slider which excels in sliding property and abrasion resistance, yields to electric charging due to friction with great difficulty, possesses high machinability, and comprises crystal grains of small particle size.

Another object of this invention is to provide a magnetic recording device using a magnetic disk excelling in sliding property and abrasion resistance.

Yet another object of this invention is to provide a magnetic recording device using ideally matched magnetic head and magnetic disk.

To accomplish the objects described above, this invention provides a magnetic recording device comprising a magnetic disk having a magnetic recording layer superposed on a substrate and a magnetic head having a slider and a magnetic core attached to the slider and adapted to be brought into contact with and separated from the surface of the aforementioned magnetic disk, wherein the magnetic recording layer of the aforementioned magnetic disk is made of a Co-based alloy and the slider of the aforementioned magnetic head has a main phase thereof formed of stabilized zirconia.

DESCRIPTION OF THE PREFERRED EMBODIMENTS

Figure 1A:
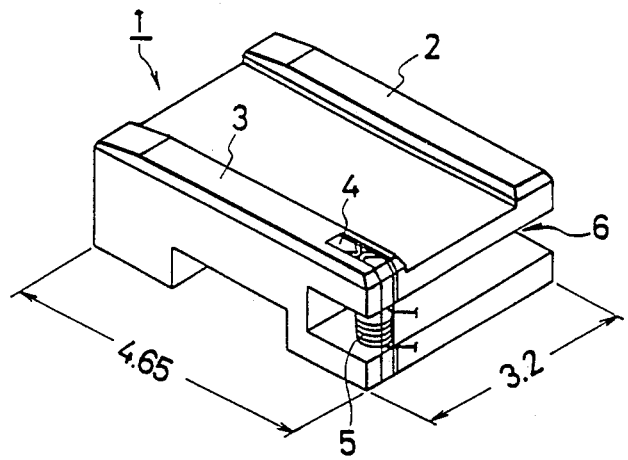
FIG. 1 is a diagram illustrating a slider used in a test described in the example.

A slider in the magnetic recording device of this invention has its main phase formed of zirconia (Zirconium oxide).

As the zirconia phase, a phase of stabilized zirconia is used. The stabilized zirconia phase excels in sliding property and, therefore, makes a suitable material for the slider of the magnetic head.

The zirconia phase is stabilized by the addition thereto of such a stabilizer. By way of example and not limitation, the stabilizer may be $Y_2O_3$, MgO, or CaO. Zirconia not containing such a stabilizer assumes a cubic crystalline structure (c-phase) at elevated temperatures (exceeding 2,400° C.). At lower temperatures in the range of 2,400° to about 1,200° C., it assumes a tetragonal crystalline structure (t-phase). At normal temperatures (not exceeding 1,200° C.), it assumes a monoclinic crystalline structure (m-phase). When the amount of the added stabilizer is extremely small, zirconia assumes a m-phase at normal temperatures. As the amount of the added stabilizer increases, the presence of the t-phase begins at normal temperatures. As the amount of the added stabilizer is further increased, the presence of the c-phase is obtained even at ambient temperatures.

In the slider of the magnetic recording device of the present invention, therefore, the zirconia phase incorporates therein the stabilizer in an amount enough for the zirconia phase to assume the cubic structure even at ambient temperature. When $Y_2O_3$ is selected as the stabilizer, it is contained in the zirconia phase in a concentration of about 5 to 20 mol % of zirconia amount. The balance of the phase is desired to be formed substantially of $ZrO_2$. Simultaneous inclusion therein of MgO or CaO poses no problem.

When the stabilizer is excessively contained, a $ZrO_2Y_2O_3$ compound such as $Y_4Zr_3O_{12}$ precipitates in the zirconia of cubic-phase to degrade the sliding property and impair the strength. Thus, the inclusion of $Y_2O_3$ in a concentration exceeding about 20 mol % is undesirable. As the amount of the added stabilizer is decreased, the t-phase and the m-phase begin to occur. When the m-phase is produced at ambient temperatures, it inevitably entails voluminal expansion. When the temperature is raised to some hundreds of degrees Centigrade and lowered repeatedly during the deposition of a coating on the slider or the inscription of patterns in the slider, there is the possibility that the heat will induce the generation of the m-phase and the slider will warp and the pattern will come out of shape. For the production of the stabilized zirconia, therefore, the lower limit of the amount of the stabilizer is desired to be fixed at the lowest possible level above the level of about 5 mol % of zirconia amount. The preferred concentration of the added stabilizer falls in the range of about 5 to about 10 mol %.

In the slider of the magnetic recording device of this invention, the crystal grains forming the main phase of the stabilized zirconia are desired to have diameters not exceeding about 12 um. Preferably, the diameters are below about 10 um. The crystal grains of the cubic zirconia generally have diameters of about 15 um. By lowering the diameters below 12 um, the machinability can be improved and the size of chippings can be reduced.

By dispersing in the main phase of zirconia fine particles of at least one compound (carbide or oxide) selected from the group consisting of the carbides of the elements of Groups IVa, Va, and VIa in the Periodic Table of Elements and alumina (aluminum oxide), the growth of the crystal grains of the zirconia phase can be curbed and the micronization of the crystal grains of the zirconia phase can be materialized.

By way of example and not limitation, of the carbides of the elements of Groups IVa, Va, and VIa in the Periodic Table of Elements are TiC, ZrC, HfC, VC, NbC, TaC, and WC. Among other carbides enumerated above, TiC is particularly desirable.

Just one carbide selected from the aforementioned group or two or more carbides selected from the group can be used. Alumina alone may be used in the place of such carbides. Alumina may be used in combination with one or more carbides selected from the aforementioned group.

Although $SiO_2$ and $Fe_2O_3$ may be contained in amounts generally tolerated as impurities, the amount of $Fe_2O_3$ is desired to be not more than about 0.1 wt %. The inclusion of $SiO_2$ poses no problem so long as the amount thereof does not exceed about 5 wt %. There is the possibility that $Y_2O_3$, CaO, and MgO which are considered to form solid solutions with the zirconia phase are partially precipitated to give rise to dispersed particles or form fine particles through combination or reaction with the added TiC and $Al_2O_3$ and such fine particles will be dispersed in the zirconia phase. This possibility poses virtually no problem.

Alumina and the aforementioned carbide are dispersed within the zirconia phase as described above to prevent the crystal grains from growing in size. Since they possess high rigidity, their particles play the part of dressing and prevent the cutting blade such as of diamond from clogging and improve it in cutting property when the zirconia ceramic is cut. Due to the high rigidity, their particles go to enhancing the abrasion resistance of the slider.

The amount of the aforementioned carbide particles to be added is in the range of about 0.5 to 30 vol % and that of the alumina particles in the range of 0.5 to 30 vol %. Preferably, the amount of about the carbide particles is in the range of 1 to 10 vol % and that of the alumina particles in the range of 1 to 10 vol %. If their amounts are less than about 0.5 vol %, their effect in micronizing the crystal grains and in improving the cutting property are not sufficient. If their amounts exceed 30 vol %, the slider is degraded in surface smoothness and in sliding property.

The slider used in the magnetic recording device of this invention is desired to possess relative density (relative to the theoretical density) of not less than 99%. By heightening the density as described above and consequently decreasing pores, the slider is enabled to acquire an excellent sliding property.

To prepare the zirconia ceramic used in the slider of the magnetic recording device of this invention, fine particles of $ZrO_2$, powdered $Y_2O_3$ selected as a stabilizer, fine particles of the carbide of an element of Group IVa, Va, or VIa (such as, for example, TiC, ZrC, HfC, VC, NbC, TaC, or WC), and fine particles of $Al_2O_3$ are mixed in prescribed proportions, amply blended, and dried and the dry mixture so formed and a small amount of binder added thereto are granulated. The granulated powder is premolded with a press provided with a cavity conforming to the contour of an article desired to be obtained. The green body is hot pressed in a vacuum at a temperature in the range of 1,400° to 1,600° C. to give rise to a sintered zirconia ceramic article.

The temperature at which this hot pressing is carried out determines the quality of the zirconia ceramic to be obtained. This temperature is required to exceed 1,400° C. for the purpose of heightening the relative density above 99%. If the temperature exceeds 1,600° C., however, the growth of the crystal grains of the stabilized zirconia becomes conspicuous. Thus, the hot pressing is desired to be carried out at temperatures not exceeding 1,600° C.

The zirconia ceramic piece obtained after the hot pressing is cut in the shape of a magnetic head slider with a diamond blade and finished as by grinding. By attaching a magnetic core, a signal coil, and an insulating film to the ceramic piece so finished in the shape of the slider, there is obtained a magnetic head. The insulating film is formed by depositing $Al_2O_3$, for example, in a thickness of about some tens of um by the sputtering technique.

In working the present invention, a magnetic core made of a film of magnetic material can be used as the magnetic transducer. The insulating film may be applied jointly to the surfaces of the magnetic core and the non-magnetic substrate or may be interposed between the non-magnetic substrate and the magnetic core.

By way of example and not limitation, the following compositions are suitable as the film core material.
(1) Co 87 at. % - Zr 5 at. % - Nb 8 at %
(2) Co 84 at. % - W 6 at. % - Zr 10 at. %
(3) Co 80 at. % - Ni 10 at. % - Zr 10 at. %
(4) Co 87 at. % - Zr 10 at. % - B 3 at. %
(5) Co 83 at. % - Zr 8 at. % - Mo 9 at. %
(6) Si 6 wt. % - Fe 92 wt. % - Ru 2 wt. %
(7) Permalloy
(8) Sendust In the compositions enumerated above, (1) through (5) are amorphous substances and (6) through (8) are crystalline substances.

Besides, as amorphous film core material, the Co-Ta-Zr compositions (containing about 10 atomic % by Ta, about 5 atomic % of Zr, and the balance of Co, for example), the Co-Nb-Zr-Hf compositions (containing about 12 atomic % of Nb, about 3 to 4 atomic % of Zr, about 0.5 to 2 atomic % of Hf, and about the balance of Co), and the same compositions additionally incorporating a small amount of B (0.1 to 2 atomic %) can be used. As the crystalline film core material, the super Sendust (containing 4 wt % of Al, 3 wt % of Ni, 6 wt % of Si, and the balance of Fe) is used similarly suitably.

The magnetic disk which accords with this invention has an undercoating layer, a magnetic film layer, and optionally a protective film layer superposed on a substrate.

Examples of the material of the substrate include aluminum, aluminum-based alloys, and ceramics represented by alumina-zirconia type ceramics.

When an aluminum-based alloy is selected as the material for the substrate, the alloy using aluminum as its main component and additionally incorporating other metal elements intended to improve at least one, preferably two or more, of the properties such as strength, rigidity, and resistance to corrosion can be advantageously used. This alloy may contain about 3 to 4% by weight of magnesium, for example. Silicon is readily educed in the form of silicon dioxide. Thus, the silicon content as an impurity is desired to be as small as possible.

When an alumina-zirconia type ceramic is selected as the material for the substrate, the composition containing not more than 30 mol % of zirconia and the balance of alumina and the stabilizer for zirconia (such as, for example, yttria, magnesia, or calcia) can be used.

As the undercoating layer, anodized layer or an electroless-plated nickel-phosphorus film can be used where the substrate is made of an aluminum-based alloy. (The thickness of this film is on the order of several um, for example)

Where the substrate is made of the alumina-zirconia type ceramic, an undercoating layer of Ti or Cr, for example, is formed by the vapor phase deposition method such as sputtering or ion plating. (The thickness of this layer is in the range of from several hundreds of angstroms to several um.)

The magnetic film layer which is superposed on the undercoating layer is formed of a Co based compound. For example, the conventional Co-Cr type and Co-V type layers having the easily magnetizing axes in the direction perpendicular to the magnetic film layer, the Co-Ni type layer for plane magnetic recording, and the layer having nitride of cobalt or nitrides of cobalt and nickel crystallized in a matrix of cobalt or in a matrix of cobalt and nickel as disclosed in Japanese Patent Application Laid-open No. SHO 57(1982)-72,307 can be used. Further, the layer containing not more than about 1 atomic % of nitrogen, not more than about 35 atomic % of nickel, and the balance of cobalt and having the easily magnetizing axis in the plane of the magnetic film layer as disclosed in Japanese Patent Application No. SHO 59(1984)-7,823 filed by the same assignee as the present invention can be advantageously used. Besides, the layers of the Co-Ni-Pt type composition (containing 0 to about 35 atomic % of Ni, about 5 to 20 atomic % of Pt, and the balance of Co) and the Co-Cr-Pt type compositions (containing 5 to 15 atomic % of Cr, 0 to 15 atomic % of Pt, and the balance of Co) and having the easily magnetizing axes within the magnetic film layers are used advantageously.

The magnetic film layer described above can be easily formed by the vapor phase deposition method such as sputtering or ion plating.

In the magnetic recording device of the present invention, the magnetic film layer may be coated with a protective film made of carbon, polyimide, silica (SiO2), polyalkylpolyether perfluoride, lithium stearate, or zinc stearate, for example. The magnetic head possessed of the slider which has as its main phase the stabilized zirconia type ceramic excellent in sliding property as described in detail above and the magnetic disk possessed of the Co alloy type magnetic recording layer exhibit extremely high mutual affinity. And they both excel in sliding property and abrasion resistance.

Now, the present invention will be described below with reference to working examples.

EXAMPLE 1
(CSS test)

First of all, magnetic recording disks formed of a substrate, an undercoating layer, a magnetic recording layer, and a protective film in varying compositions were prepared.

(1) Materials for substrate (the following two compositions)

a. Substrate of alumina-zirconia type ceramic (composition: 80 mol % of alumina, 18.2 mol % of zirconia, and 1.8 mol % of yttria)

b. Substrate of aluminum alloy (composition: 4% by weight of magnesium and the balance of aluminum)

Dimensions of substrate: 130 mm in outside diameter 40 mm in inside diameter, and 2 mm in thickness (2) Materials for undercoating layer and magnetic recording layer (the following four compositions)

* With the substrate of alumina-zirconia ceramic a. Ti layer (500 Å in thickness), Fe-80Ni layer (5,000 A in thickness), and Co-Cr layer (3,000 Å in thickness) superposed sequentially in the order mentioned on the substrate.

b. Cr layer (2 μm in thickness) and Co-Ni layer (800 Å A in thickness) superposed sequentially in the order mentioned on the substrate.

* With the substrate of aluminum alloy a. Ni-P layer (20 μm in thickness), Fe-80Ni layer (5,000 A in thickness), and Co-Cr layer (3,000 Å in thickness) superposed sequentially in the order mentioned on the substrate.

b. Ni-P layer (2 μm in thickness), Cr layer (2 μm in thickness), and Co-Ni layer (800 Å in thickness) superposed sequentially in the order mentioned on the substrate.

The Co-Cr layer contains 20 atomic % of Cr and the balance of Co. The Co-Ni layer contains 25 atomic % of Ni and the balance of Co.

The Ni-P layer is an electroless plated nickel-phosphorus layer containing 10 atomic % of P and the balance of Ni.

(3) Materials for protective layer (the following three substances)

a Carbon deposited in a thickness of 200 Å b. Polyalkylpolyesterperfluoride deposited in a thickness of 50 Å c. Lithium stearate deposited in a thickness of 200 Å

Magnetic heads were prepared by attaching a film head core to sliders of varying materials indicated below.

(4) Materials for slider (the following three compositions)

a. Zirconia type (composition: 94 mol % of zirconia and 6 mol % of yttria)

b. Zirconia-alumina type (composition: 87 mol % of zirconia, 8 mol % of yttria, and 5 mol % of alumina)

c. Zirconia-alumina-titanium carbide type (composition: 83 mol % of zirzonia, 7 mol % of yttria, 5 mol % of alumina, and 5 mol % of titanium carbide)

Figure 1B:
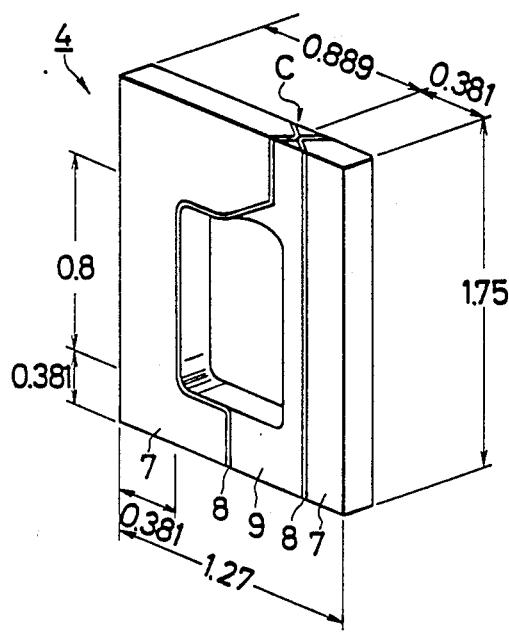
Figure 1C:
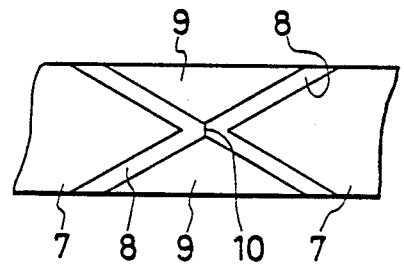

The shape and dimensions (in mm) of the slider and the position for attachment of the head core are illustrated in FIG. 1 (a). FIG. 1 (b) is a perspective view illustrating the head core as enlarged.

As illustrated, a slider 1 is a rectangular plate, with raised strips 2, 3 formed along the opposite lateral sides of the sliding surface (upper side) thereof. On the trailing end surface of the slider 1, a depression 6 extended throughout in the direction of the width of the slide is formed. At the trailing end side of the raised strip 3 relative to the direction of advance, a film head core 4 having a coil 5 wound thereon is set in position in a manner intersecting the aforementioned depression 6.

The head core 4, as illustrated in FIG. 1 (c) representing the C portion of FIG. 1 (b) in an enlargement, comprises a pair of main bodies 7 made of Mn-Zn ferrite, magnetic films 8 formed on the opposed surfaces of the main bodies 7, and glass pieces 9 interposed between the adjacent magnetic films 8. Gaps 10 intervene between the magnetic films 8, 8.

Figure 2:
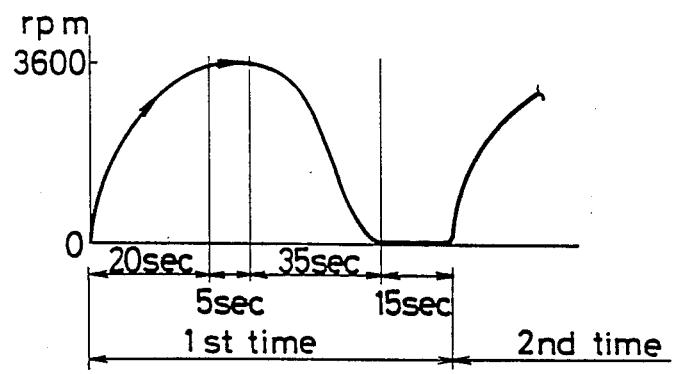
FIG. 2 is a time schedule for the CSS test described in the example.

The magnetic head just described and the various magnetic disks mentioned above were tested for CSS durability. The time schedule of the disk's stop - start - stop -. . . is shown in FIG. 2. When the rotational speed of the disk was 3,600 rpm, the amount of buoyance of the outflow end of the head was 0.35 um.

The time at which the drop of the output from the medium totalled 10% was noted as the termination of service life.

The results are shown in Table 1.

EXAMPLE 2

(spherical surface sliding test)

Hemispheres 30 mm in radius of curvature were prepared with the same materials as used in sliders of Example 1. Each of the hemispheres was placed in contact with the surface of the aforementioned magnetic disk under load of 20 g and the magnetic disk was rotated in situ at a rotational speed of 360 rpm. The rotational speed of the magnetic disk at the point of contact with the hemisphere was about 2 m/sec. The time at which the drop of the output from the medium totalled 10% was noted as the termination of service life. The compensation for the deterioration of the head was effected in comparison with that for the standard disk.

The results are shown in Table 1.

Comparative Experiment

The CSS test and the spherical surface sliding test were performed by following the procedures of Example 1 and Example 2, except that the sliders and the hemispheres were made of the known alumina-titanium carbide type ceramic (composition: 30% by weight of titanium carbide and the balance of alumina). The results are shown in Table 1.

It is noted from Table 1 that the samples according with the working examples previously discussed were decisively superior in CSS property and spherical surface sliding property to the samples of the conventional countertype. Among other disk substrates, the substrates of alumina-zirconia type ceramic were particularly excellent.

The symbols used in Table 1 represent the following substances.
Z—Zirconia type
ZA—Zirconia-alumina type
ZAT—Zirconia-alumina-titanium carbide type
K—Polyalkylpolyester perfluoride
C—Carbon
ST—Lithium stearate
Al—Aluminum alloy substrate
AZ—Alumina-zirconia type ceramic substrate The results of the CSS test were evaluated by the following six-point scale, wherein:
A—More than 300,000 times
B—Between 300,000 and 100,000 times
C—Between 100,000 and 50,000 times
D—Between 50,000 and 30,000 times
E—Between 30,000 to 20,000 times
F—Less than 20,000 times The results of the spherical surface sliding test were evaluated by the following four-point scale, wherein:
A—More than 3,000,000 times
B—Between 3,000,000 and 1,000,000 times
C—Between 1,000,000 and 300,000 times
D—Less than 300,000 times

TABLE 1

| No. | Material of slider | Material of medium | Material of protective film | Material of disk substrate | Rating of property CSS | Sliding property | Remarks |
|---|---|---|---|---|---|---|---|
| 1 | Z | Co—Cr | K | A | D | B | |
| 2 | " | " | " | AZ | B | A | |
| 3 | " | Co—Ni | " | A | D | B | |
| 4 | " | " | " | AZ | B | A | |
| 5 | ZA | Co—Cr | " | A | D | B | |
| 6 | " | " | " | AZ | B | A | |
| 7 | " | Co—Ni | " | A | D | B | |
| 8 | " | " | " | AZ | B | A | |
| 9 | ZAT | Co—Cr | " | A | D | B | |
| 10 | " | " | " | AZ | B | A | Example |
| 11 | " | " | C | A | D | B | |
| 12 | " | Co—Cr | C | AZ | B | A | |
| 13 | " | " | ST | A | C | B | |
| 14 | " | " | " | AZ | A | A | |
| 15 | " | Co—Ni | K | A | D | B | |
| 16 | " | " | " | AZ | B | A | |
| 17 | " | " | C | A | D | B | |
| 18 | " | " | " | AZ | B | A | |
| 19 | " | " | ST | A | C | B | |
| 20 | " | " | " | AZ | A | A | |
| 21 | Al₂O₃—30% TIC | Co—Cr | K | A | E | C | |
| 22 | " | " | " | AZ | F | D | Comparative experiment |

What is claimed is:

1. A magnetic head comprising a slider portion and a magnetic core attached to the slider portion, the slider portion consisting essentially of zirconia and 5 to 20 mol % of a stabilizer so that the zirconia has a stabilized main phase having cubic cyrstal grains at a temperature below about 1200 deg. C. and the diameter of the cubic grains of the main phase of the zirconia being less than 12 μm.

2. The magnetic head as set forth in claim 1, wherein fine particles of at least one compound selected from the group consisting of the carbides of the elements of Groups IVa, Va and VIa in the periodic Table of Elements and alumina are dispersed in the stabilized zirconia phase of the slider.

3. The magnetic head as set forth in claim 2, wherein the amount of the carbide particle is in the range of about 0.5 to 30 vol. % and the amount of the alumina particles is in the range of about 0.5 to 30 vol %.

4. The magnetic head as set forth in claim 2, wherein the amount of the carbide particles is in the range of about 1 to 10 vol % and the amount of the alumina particles is in the range of about 1 to 10 vol %.

5. The magnetic head as set forth in claim 1, wherein the stabilizer is selected from the group consisting of $Y_2O_3$, MgO and CaO.

6. The magnetic head as set forth in claim 1, wherein the concentration of the stabilizer in the stabilized main phase of zirconia is about 5 to 10 mol %.

7. The magnetic head as set forth in claim 1, wherein the stabilized zirconia phase of the slider portion contains $Y_2O_3$ in a concentration of 5 to 10 mol %.

8. The magnetic head as in claim 1 wherein the diameters of the cubic grains of the main phase of the zirconia are less than about 10 μm.

* * * * *